(12) United States Patent
Hollebrandse et al.

(10) Patent No.: US 12,079,869 B2
(45) Date of Patent: Sep. 3, 2024

(54) SYSTEMS AND METHODS FOR AUTOMATED SELECTION OF STANDING SETTLEMENT INSTRUCTIONS

(71) Applicant: JPMORGAN CHASE BANK, N.A., New York, NY (US)

(72) Inventors: Florenz Allewijn Pieter Hollebrandse, Glasgow (GB); Koushik Sampath Kumar, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 110 days.

(21) Appl. No.: 18/048,961

(22) PCT Filed: Apr. 28, 2020

(86) PCT No.: PCT/US2020/030295
§ 371 (c)(1),
(2) Date: Oct. 24, 2022

(87) PCT Pub. No.: WO2021/221619
PCT Pub. Date: Nov. 4, 2021

(65) Prior Publication Data
US 2023/0360127 A1 Nov. 9, 2023

(51) Int. Cl.
*G06Q 40/04* (2012.01)
(52) U.S. Cl.
CPC .................. *G06Q 40/04* (2013.01)
(58) Field of Classification Search
CPC .................................................. G06Q 40/04
(Continued)

(56) References Cited

U.S. PATENT DOCUMENTS 7,729,972 B2 * 6/2010 Murphy et al. ................. 705/36
7,734,518 B2 * 6/2010 Toffey ............................ 705/35
(Continued)

OTHER PUBLICATIONS

DTCC, Embracing Post-Trade Automation, Nov. 2020, The Depository Trust & Clearing Corporation. (Year: 2020).*
(Continued)

*Primary Examiner* — Scott C Anderson
*Assistant Examiner* — George N. Proios
(74) *Attorney, Agent, or Firm* — GREENBERG TRAURIG LLP

(57) ABSTRACT

Systems and methods for automated selection of standing settlement instructions are disclosed. According to one embodiment, in an information processing apparatus comprising at least one computer processor a method for automated selection of standing settlement instructions may include: (1) receiving, from a trading platform, historic trade data for a plurality of customers; (2) training a generic SSI sub-model with the historic trade data for the plurality of customers, resulting in a generic SSI prediction; (3) training a customer-specific SSI sub-model with the historic trade data for one of the customers, resulting in a customer-specific SSI prediction; (4) combining the generic SSI prediction and the customer-specific SSI prediction resulting in a final classification model; (5) receiving a trade to be executed for the customer; (6) applying the final classification model to the trade, resulting in a final SSI selection; and (7) executing the trade using the final SSI selection.

20 Claims, 2 Drawing Sheets

(58) Field of Classification Search
USPC .......................................................... 705/37
See application file for complete search history.

(56) References Cited

U.S. PATENT DOCUMENTS

| | | |
|---|---|---|
| 2005/0234807 A1 | 10/2005 | Toffey |
| 2008/0281750 A1 | 11/2008 | Toffey et al. |
| 2009/0076934 A1* | 3/2009 | Shahbazi et al. ............... 705/30 |
| 2010/0287091 A1 | 11/2010 | Toffey |
| 2018/0276541 A1 | 9/2018 | Studnitzer et al. |
| 2020/0097981 A1* | 3/2020 | Teo et al. ............. G06Q 30/016 |
| 2020/0334580 A1* | 10/2020 | Sheopuri et al. ...... G06N 20/20 |
| 2022/0335488 A1* | 10/2022 | Horesh et al. ......... G06Q 30/04 |
| 2023/0252561 A1* | 8/2023 | Wellmann et al. .... G06Q 40/04 |

OTHER PUBLICATIONS

International Search Report and Written Opinion of the International Searching Authority, dated Sep. 9, 2020, from corresponding International Application No. PCT/US2020/030295.

* cited by examiner

SYSTEMS AND METHODS FOR AUTOMATED SELECTION OF STANDING SETTLEMENT INSTRUCTIONS

BACKGROUND OF THE INVENTION

1. Field of the Invention

Embodiments are directed to systems and methods for automated selection of standing settlement instructions.

2. Description of the Related Art

Standing Settlement Instructions (SSI) are a customer's instructions for payment and delivery of cash securities. When a customer executes a securities trade, a relevant SSI needs to be selected depending on the product and market. Customers may have may SSIs, each associated with data attributes indicating under which conditions such a SSI should be used by default. Maintaining this SSI reference data is error prone and may not truly reflect customers' settlement preferences. This often requires support staff to correct trades when incorrect SSIs were recorded.

SUMMARY OF THE INVENTION

Systems and methods for automated selection of standing settlement instructions are disclosed. According to one embodiment, in an information processing apparatus comprising at least one computer processor a method for automated selection of standing settlement instructions may include: (1) receiving, from a trading platform, historic trade data for a plurality of customers; (2) training a generic SSI sub-model with the historic trade data for the plurality of customers, resulting in a generic SSI prediction; (3) training a customer-specific SSI sub-model with the historic trade data for one of the customers, resulting in a customer-specific SSI prediction; (4) combining the generic SSI prediction and the customer-specific SSI prediction resulting in a final classification model; (5) receiving a trade to be executed for the customer; (6) applying the final classification model to the trade, resulting in a final SSI selection; and (7) executing the trade using the final SSI selection.

In one embodiment, the generic SSI prediction may include a generic clearing mechanism prediction and a generic account prediction.

In one embodiment, the generic account prediction is based on accounts that are available to the customer.

In one embodiment, the customer-specific SSI prediction may include a customer-specific SSI clearing mechanism prediction and a customer-specific SSI account prediction.

In one embodiment, the final SSI selection may include a final SSI account.

In one embodiment, the step of training a generic SSI sub-model with the historic trade data for the plurality of customers may include: extracting trade attributes from the historic trade data for the plurality of customers; transforming the extracted trade attributes for the plurality of customers into numerical data; and classifying the transformed trade attributes using a first classification model selected from the group consisting of logistic regressions, decision trees, random forests, and neural networks.

In one embodiment, the trade attributes may include at least one of a trade identifier, a trade date, a customer country of domicile, and a trade product type.

In one embodiment, the method may further include receiving SSI reference data for the customer.

In one embodiment, the step of training a customer-specific SSI sub-model with the historic trade data for the customer may include: extracting trade attributes from the historic trade data for the customer; transforming the extracted trade attributes for the customer into numerical data; and classifying the transformed trade attributes for the customer using a second classification model selected from the group consisting of logistic regressions, decision trees, random forests, and neural networks.

In one embodiment, the final classification model may be based on a probability weighting of an output of the generic SSI prediction and the customer-specific SSI prediction.

According to another embodiment, a system for automated selection of standing settlement instructions may include a trading platform; and a computing device comprising at least one computer processor and executing a computer program. The computer program may: receive, from the trading platform, historic trade data for a plurality of customers; train a generic SSI sub-model with the historic trade data for the plurality of customers, resulting in a generic SSI prediction; train a customer-specific SSI sub-model with the historic trade data for one of the customers, resulting in a customer-specific SSI prediction; combine the generic SSI prediction and the customer-specific SSI prediction resulting in a final classification model; receive a trade to be executed for the customer from the trading platform; apply the final classification model to the trade, resulting in a final SSI selection; and execute the trade using the final SSI selection on the trading platform.

In one embodiment, the generic SSI prediction may include a generic clearing mechanism prediction and a generic account prediction.

In one embodiment, the generic account prediction may be based on accounts that are available to the customer.

In one embodiment, the customer-specific SSI prediction may include a customer-specific SSI clearing mechanism prediction and a customer-specific SSI account prediction.

In one embodiment, the final SSI selection may include a final SSI account.

In one embodiment, in training the generic SSI sub-model, the computer program may further: extract trade attributes from the historic trade data for the plurality of customers; transform the extracted trade attributes for the plurality of customers into numerical data; and classify the transformed trade attributes using a first classification model selected from the group consisting of logistic regressions, decision trees, random forests, and neural networks.

In one embodiment, the trade attributes may include at least one of a trade identifier, a trade date, a customer country of domicile, and a trade product type.

In one embodiment, the computer program may further receive SSI reference data for the customer.

In one embodiment, in training the customer-specific SSI sub-model, the computer program may further: extract trade attributes from the historic trade data for the customer; transform the extracted trade attributes for the customer into numerical data; and classify the transformed trade attributes for the customer using a second classification model selected from the group consisting of logistic regressions, decision trees, random forests, and neural networks.

In one embodiment, the final classification model may be based on a probability weighting of an output of the generic SSI prediction and the customer-specific SSI prediction.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Systems and methods for automated selection of standing settlement instructions are disclosed.

To improve the accuracy of SSI selection, and to reduce the manual effort in correcting trades, embodiments are directed to a machine learning-based system and method for automated selection of standing settlement instructions is disclosed. In embodiments, an ensemble machine-learning model may include two sub-models: a customer-specific model and a generic model. In embodiment, the generic model may predict the most likely SSIs, based on, for example, past trade records for all customers. This may be achieved by extracting generic attributes from all SSIs, such as the custodian/clearing mechanism.

The generic model may enable prediction for new customers, or customers that have not used at least some of their SSIs in the past.

The customer-specific model may predict the most likely SSIs, based on the specific customer's past trades.

The prediction of the most likely SSI may be obtained by combining the outputs from both sub-models. This may include, for example, weighing each model's output probabilities, or any other suitable method.

Each model may be trained against historical data, such as historic bond trading data. For example, the models may be trained against a single view of historic trade data, such as 12 months or longer. The training task may collect all trade records from a trade platform (e.g., a risk and trade management platform or settlement system), where each record may represent a single transaction between two parties or accounts.

Each transaction may have transaction attributes, including, for example: (1) a trade identifier; (2) a trade execution date; (3) a customer account identifier; (4) a customer country of domicile; (5) a product type (e.g., bond forward, option, future, etc.); (6) bond currency; (7) settlement currency; (8) bond identifier (e.g., ISIN); (9) bond issuer data (e.g., country, industry sector, etc.); (10) clearing mechanism or custodian (e.g., a security depository such as Euroclear, Cedel DTC, etc.); and (11) SSI identifier. The clearing mechanism and the SSI identifier may represent the known SSI information from the historic trade data to be used as part of a supervised learning algorithm in combination with input features (e.g., items 1-9). Additional trade features may be incorporated into the model as required to improve prediction accuracy as is necessary and/or desired.

Figure 1:
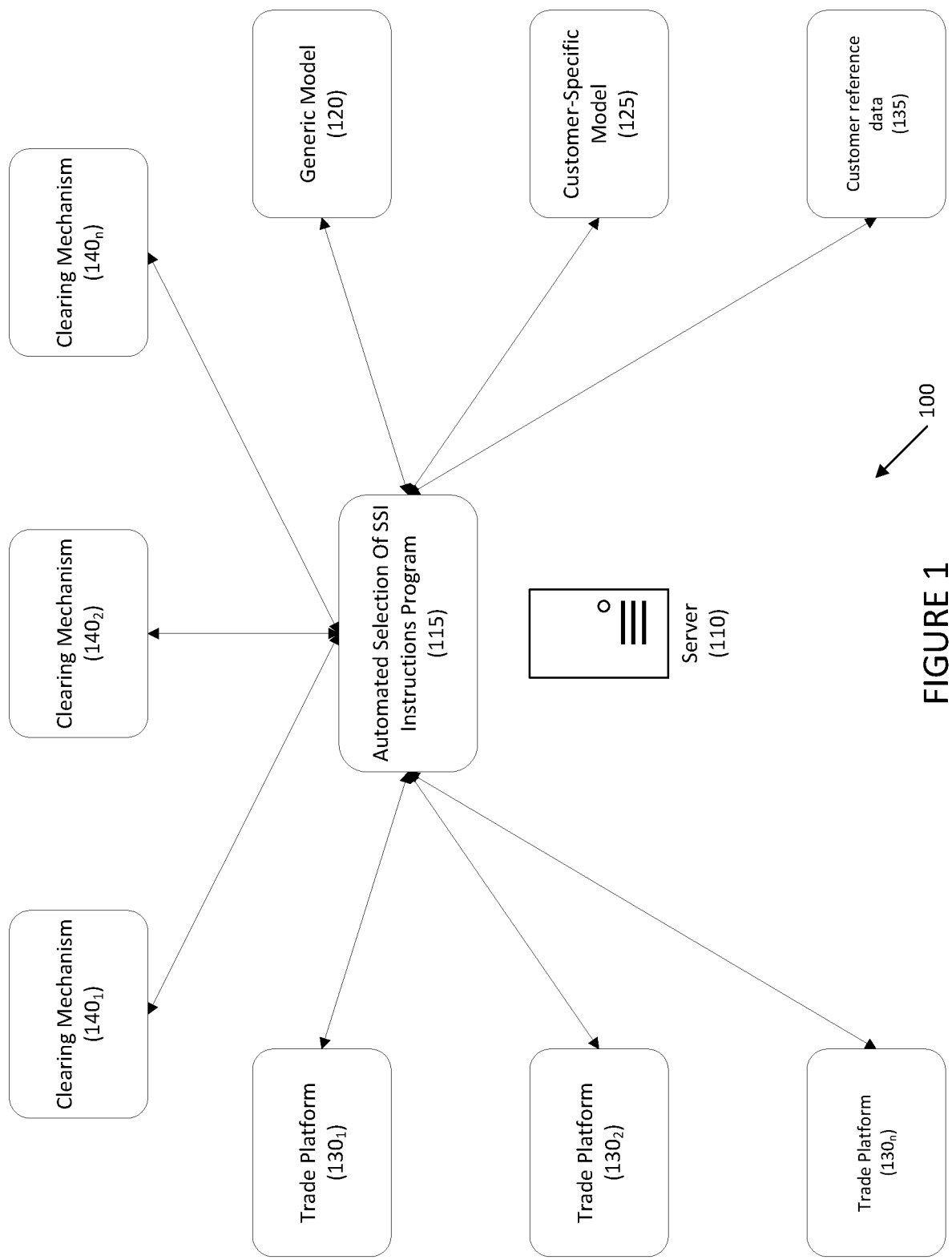
FIG. 1 depicts an architectural diagram of a system for automated selection of standing settlement instructions according to one embodiment.

Referring to FIG. 1, an architectural diagram of a system for automated selection of standing settlement instructions is disclosed according to one embodiment. System 100 may include server or any other suitable computing or electronic device 110 that may execute automated selection of standing settlement instructions computer program 115. Computer program 115 may be a program, an application, etc.

Computer program 115 may receive trade records from trade platform 130, which may be a trade platform for a financial instrument. Trade platform may be, for example, a risk and trade management platform or settlement system, and each record may represent a single transaction between two parties.

In one embodiment, a plurality of trade platforms $130_1$, $130_2$, ... $130_n$ may be provided.

Each transaction may have transaction attributes, including, for example: (1) a trade identifier; (2) a trade date; (3) a customer account identifier; (4) a customer country of domicile; (5) a product type (e.g., bond forward, option, future, etc.); (6) bond currency; (7) settlement currency; (8) bond identifier (e.g., ISIN); (9) bond issuer data (e.g., country, industry sector, etc.); (10) clearing mechanism or custodian (e.g., a security depository such as Euroclear, Cedel DTC, etc.); and (11) SSI identifier. The clearing mechanism and the SSI identifier represent the known SSI information from the historic trade data to be used as part of a supervised learning algorithm in combination with input features (e.g., items 1-9). Additional trade features may be incorporated into the model as required to improve prediction accuracy as is necessary and/or desired.

Trade platform 130 may have access to customer reference data 135, which may include customer trading account data alongside a list of SSIs for each customer. Each of these SSIs may include data attributes such as custodian/clearing mechanism, account number, and other attributes relevant for settlement of executed trades.

System 100 may further include a plurality of clearing mechanisms $140_1$, $140_2$, ... $140_n$.

Figure 2:
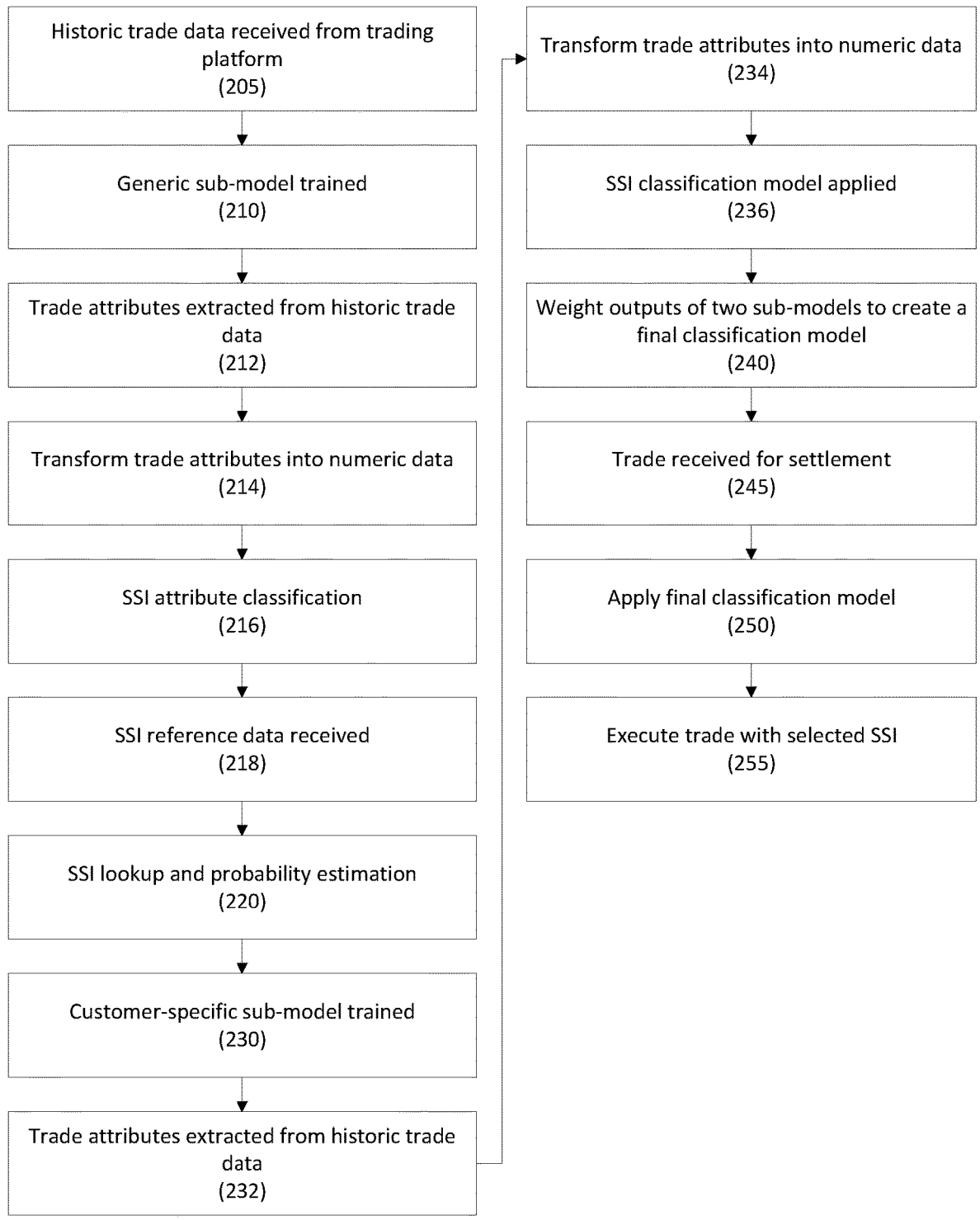
FIG. 2 depicts a method for automated selection of standing settlement instructions according to one embodiment.

Referring to FIG. 2, a method for automated selection of standing settlement instructions is disclosed according to one embodiment. In general, once historic trade data is received, a generic sub-model may be trained, and then a customer-specific sub-model may be trained. Based on the generic sub-model and the customer-specific sub-model, a final classification model may be created. When an actual trade from a customer is then received, the final classification model may be applied to identify the SSI, and the trade may be executed with the identified SSI.

In step 205, historic trade data may be received from a trading system. In one embodiment, the historic trade data may be for a plurality of users.

In step 210, a generic sub-model may be trained. In one embodiment, the training process may include the extraction of trade attributes from the received historical trade data (step 212), the transformation of trade attributes into numeric data (step 214), SSI attribute classification (step 216), the receipt of SSI reference data (step 218), and SSI lookup and probability estimation (step 220). These steps will be described in greater detail below.

In step 212, trade attributes may be extracted from the historic trade data for the plurality of customers. Trade attributes such as a trade identifier, a trade date, a customer country of domicile, a product type (e.g., bond forward, option, future, etc.), bond currency, settlement currency, bond identifier (e.g., ISIN), and bond issuer data (e.g., country, industry sector, etc.) may be considered. Note that the customer account identifier is not considered for the generic sub-model. This results in a view of historic trade information agnostic of individual customers, while retaining certain customer features, such as country of domicile.

In step 214, the trade attributes from the historical trade data for the plurality of customers may be transformed. For example, the extracted trade attributes may be transformed into numeric data, suitable for incorporation into statistical models. This may include labelled data encoding as numeric values, one-hot-encoding of categorical data, data scaling, etc. In addition, to allow the model to be used both under training and prediction conditions, data imputation may be applied for missing values and values encountered during prediction but not during model training may be replaced.

In step 216, SSI attribute classification models may be applied to the transformed trade attributes. SSI classification models may include, for example, one or more classification models that predict the value for one specific SSI attribute, such as the most likely security depository (e.g., clearing mechanism or custodian for trade settlement) based on all customers' trends. For example, a customer trading German government bonds may be most likely to settle a trade with Security Depository #1. Other models may include classifiers of financial institution-specific SSI and account attributes. Note that each model may return a ranked list of most likely predictions, along with probabilities for each of the predictions.

An illustrative example of a prediction is provided in Table 1, below:

TABLE 1

| Clearing Mechanism Prediction | Probability |
|---|---|
| Security Depository #1 | 80% |
| Security Depository #2 | 15% |
| Security Depository #3 | 5% |

In step 218, SSI reference data for individual customers may be received or held within the trade platform. In one embodiment, this may be received from a customer reference database. A trade platform may have access to all SSI information linked with customer accounts, and a single customer account may be associated with multiple SSIs.

In step 220, a SSI lookup and probability estimation may be performed on the attribute predictions to provide a final output for the generic sub-model. In one embodiment, the attribute predictions (e.g., from step 216) may be matched against the customer's available SSIs. For example, if the classification model in step 216 predicted the most likely clearing mechanism to be Security Depository #1, any available SSI with the clearing mechanism of Security Depository #1 is selected.

In one embodiment, the estimation may be applied for all clearing mechanisms with a probability greater than 0%. Note that a customer may have multiple SSIs with the same attributes, for example, multiple SSIs with the clearing mechanism Security Depository #1.

Table 2 illustrate an example of how the predictions for trade attributes may be applied against the customer's SSI reference data:

TABLE 2

| Clearing Mechanism Prediction | Probability | Available SSI for customer | Probability for SSI |
|---|---|---|---|
| Security Depository #1 | 80% | Account ID 1 | 40% |
| | | Account ID 2 | 40% |
| Security Depository #2 | 15% | Account ID 3 | 15% |
| Security Depository #3 | 5% | None | N/A |

In this example, both Security Depository #1 and Security Depository #1 are assumed to have an equal likelihood of selection. Other models may be employed at this stage to estimate the probability of these (and all other) SSIs based on other attributes, such as most-frequently used, or other schemes.

The classification models in step 216 may be implemented using any suitable mathematical algorithm, including Logistic Regressions, Decision Trees, Random Forests, Neural Networks, etc. During the model training stage, the best performing algorithm may be adopted. Each of these algorithms may be associated with one or more hyperparameters which may be selected manually prior to model training or optimized as part of the supervised learning algorithm.

In step 230, the customer-specific SSI sub-model may be trained. The training of the customer-specific SSI model may include the extraction of trade attributes from the received historical trade data for the customer (step 232), the transformation of trade attributes into numeric data (step 234), and SSI attribute classification (step 236). These steps will be described in greater detail below.

In step 232, features may be selected. Trade attributes such as a trade identifier, a trade date, a customer account identifier, a customer country of domicile, a product type (e.g., bond forward, option, future, etc.), bond currency, settlement currency, bond identifier (e.g., ISIN), and bond issuer data (e.g., country, industry sector, etc.) may be considered. Note that the customer account identifier is considered for the generic sub-model.

In step 234 the features may be transformed. This may be similar to step 214, above.

In step 236, a SSI classification model may be applied to provide a final output from the customer-specific sub-model. Instead of predicting attributes of customers' SSIs, this model directly predicts individual SSIs. The outcomes may be ranked and probabilities assigned.

Using the example from above, Table 3 the prediction for a specific customer may look like this:

TABLE 3

| Clearing Mechanism Prediction | Probability |
|---|---|
| Security Depository #1 Account ID 1 | 3% |
| Security Depository #1 Account ID 2 | 95% |
| Security Depository #2 Account ID 3 | 2% |

Note that this model may only be capable of predicting SSIs that have been used for previous trades.

As this model is trained against records of trades against individual customer accounts, non-parametric machine learning models may be used. This may include a k-nearest neighbor model ranking trades by similarity against all relevant trade features. Time decaying weighing may be applied where customers' SSI preferences are shifting over time.

It should be noted that the training of the generic and the customer-specific sub-models may occur in any order, or they may occur in parallel.

In step 240, the outputs of the generic sub-model and the customer-specific sub-model may be combined to create a final classification model. In one embodiment, ensemble model aggregation may be applied based on the probability ranking from each of the two sub-models. A simple weighting may be applied, whereby the weighting factors are fixed and calibrated during the model training stage. Other schemes may be applied, such as where the weights depend on the outputs of the sub-models. Alternatively, entirely different algorithms may be used to combine the outputs from both models.

For example, if the customer-specific model is implemented using a nearest neighbor scheme, the actual "distance" to the nearest neighbor/most similar trade may be used to adjust any weighting.

Continuing with the example above, an example of a final classification is illustrated in Table 4:

TABLE 4

| Available SSI For Customer | Generalized Model | Probability Customer-Specific Model | Aggregated | Rank |
|---|---|---|---|---|
| Security Depository #1 Account ID 1 | 40% | 3% | 21.5% | 2 |
| Security Depository #1 Account ID 2 | 40% | 95% | 67.5% | 1 |
| Security Depository #2 Account ID 3 | 15% | 2% | 8.5% | 3 |

This example assumes that each model has an equal weighting. In embodiments, the weighting factor resulting in the most accurate overall model is expected to weight the customer-specific model more than the generalized model. Note that the probabilities from each model, and the aggregated probability may be scaled to sum to 100%.

In step 245, a trade that is to be settled may be received. This trade may be received from any suitable system.

In step 250, the final classification model may be applied. For example, the SSI with the highest aggregated probability may be selected.

In the above example, this would be the Security Depository #1 account ID 2. For operations and diagnostic purposes, the full ranked list of all SSIs with probability greater than zero may be made available within applications with the trade and risk management platform.

In step 255, the trade may be executed and settled using the SSI selected by the model. For example, the computer program or application may generate a signal that instructs the previously trained model to predict and apply the SSI. Relevant trade attributes (as used during the model training phase) may be applied as inputs to the model after which the model is executed to obtain a prediction of the most likely SSI.

The predicted SSI obtained in step 255 may be applied and stored alongside other trade attributes. Users may review the automated SSI selection and correct this if and when it is necessary within the trade platform.

In embodiments, the model may be retrained using recently recorded trade data using the method of FIG. 2, or any other suitable method. Retraining may be undertaken on a regular basis or trade data is recorded.

Although several embodiments have been disclosed, it should be recognized that these embodiments are not mutually exclusive, and features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated selection of standing settlement instructions comprising:
   in an information processing apparatus comprising at least one computer processor:
      receiving, from a trading platform, historic trade data for a plurality of customers;
      training a generic SSI sub-model with the historic trade data for the plurality of customers, resulting in a generic SSI prediction;
      training a customer-specific SSI sub-model with the historic trade data for one of the customers, resulting in a customer-specific SSI prediction;
      combining the generic SSI prediction and the customer-specific SSI prediction resulting in a final classification model;
      receiving a trade to be executed for the customer;
      applying the final classification model to the trade, resulting in a final SSI selection; and
      executing the trade using the final SSI selection.

2. The method of claim 1, wherein the generic SSI prediction comprises a generic clearing mechanism prediction and a generic account prediction.

3. The method of claim 2, wherein the generic account prediction is based on accounts that are available to the customer.

4. The method of claim 1, wherein the customer-specific SSI prediction comprises a customer-specific SSI clearing mechanism prediction and a customer-specific SSI account prediction.

5. The method of claim 1, wherein the final SSI selection comprises a final SSI account.

6. The method of claim 1, wherein the step of training a generic SSI sub-model with the historic trade data for the plurality of customers comprises:
   extracting trade attributes from the historic trade data for the plurality of customers;
   transforming the extracted trade attributes for the plurality of customers into numerical data; and
   classifying the transformed trade attributes using a first classification model selected from the group consisting of logistic regressions, decision trees, random forests, and neural networks.

7. The method of claim 6, wherein the trade attributes include at least one of a trade identifier, a trade date, a customer country of domicile, and a trade product type.

8. The method of claim 6, further comprising:
   receiving SSI reference data for the customer.

9. The method of claim 1, wherein the step of training a customer-specific SSI sub-model with the historic trade data for the customer comprises:
   extracting trade attributes from the historic trade data for the customer;
   transforming the extracted trade attributes for the customer into numerical data; and
   classifying the transformed trade attributes for the customer using a second classification model selected from the group consisting of logistic regressions, decision trees, random forests, and neural networks.

10. The method of claim 1, wherein the final classification model is based on a probability weighting of an output of the generic SSI prediction and the customer-specific SSI prediction.

11. A system for automated selection of standing settlement instructions comprising:
   a trading platform; and
   a computing device comprising at least one computer processor and executing a computer program;
   wherein the computer program:
      receives, from the trading platform, historic trade data for a plurality of customers;
      trains a generic SSI sub-model with the historic trade data for the plurality of customers, resulting in a generic SSI prediction;
      trains a customer-specific SSI sub-model with the historic trade data for one of the customers, resulting in a customer-specific SSI prediction;
      combines the generic SSI prediction and the customer-specific SSI prediction resulting in a final classification model;
      receives a trade to be executed for the customer from the trading platform;
      applies the final classification model to the trade, resulting in a final SSI selection; and
      executes the trade using the final SSI selection on the trading platform.

12. The system of claim 11, wherein the generic SSI prediction comprises a generic clearing mechanism prediction and a generic account prediction.

13. The system of claim 12, wherein the generic account prediction is based on accounts that are available to the customer.

14. The system of claim 11, wherein the customer-specific SSI prediction comprises a customer-specific SSI clearing mechanism prediction and a customer-specific SSI account prediction.

15. The system of claim 11, wherein the final SSI selection comprises a final SSI account.

16. The system of claim 11, wherein in training the generic SSI sub-model, the computer program further:
   extracts trade attributes from the historic trade data for the plurality of customers;
   transforms the extracted trade attributes for the plurality of customers into numerical data; and
   classifies the transformed trade attributes using a first classification model selected from the group consisting of logistic regressions, decision trees, random forests, and neural networks.

17. The system of claim 16, wherein the trade attributes include at least one of a trade identifier, a trade date, a customer country of domicile, and a trade product type.

18. The system of claim 16, wherein the computer program further receives SSI reference data for the customer.

19. The system of claim 11, wherein in training the customer-specific SSI sub-model, the computer program further:
   extracts trade attributes from the historic trade data for the customer;
   transforms the extracted trade attributes for the customer into numerical data; and
   classifies the transformed trade attributes for the customer using a second classification model selected from the group consisting of logistic regressions, decision trees, random forests, and neural networks.

20. The system of claim 11, wherein the final classification model is based on a probability weighting of an output of the generic SSI prediction and the customer-specific SSI prediction.

* * * * *